United States Patent [19]
Huntington et al.

[11] 3,946,602
[45] Mar. 30, 1976

[54] PISTON RING TENSION GAGE

[76] Inventors: Keith D. Huntington, 405 Forest St., Eaton Rapids, Mich. 48827; Clarke E. Heminger, 12021 S. M-52, Perry, Mich. 48872

[22] Filed: June 16, 1975

[21] Appl. No.: 587,100

[52] U.S. Cl. ............................................. 73/120
[51] Int. Cl.² ........................................ G01M 19/00
[58] Field of Search ........................... 73/120, 71.6

[56] References Cited
UNITED STATES PATENTS

| | | | |
|---|---|---|---|
| 2,558,226 | 6/1951 | Sparrow | 73/120 |
| 2,580,342 | 12/1951 | Aller et al. | 73/120 X |

*Primary Examiner*—Jerry W. Myracle
*Attorney, Agent, or Firm*—Miller, Morriss, Pappas & McLeod

[57] ABSTRACT

A piston ring tension gage consisting of a ring compression test fixture provided with a digital strain readout indicating for automatically determining the pressure exerted by a piston ring assembly in a simulated operative use position. The ring compression test fixture comprises a fixed semi-circular plate which coacts with a pivotally mounted movable semi-circular plate to retain a piston ring assembly therebetween. A pneumatic cylinder and piston rod provided with a strain load sensing means acts directly against the movable plate so as to determine the pressure exerted by the piston ring being tested. Vibratory means are provided in association with the ring compression test fixture so as to obtain friction free test reading. The tension measuring, vibration and tension reading steps are automatically sequenced at a controlled rate to provide repetitive accuracy in the testing.

9 Claims, 8 Drawing Figures

PISTON RING TENSION GAGE

SUMMARY OF THE INVENTION

This invention relates to a piston ring tension gage for measuring pressure exerted by a piston ring when selectively compressed to a predetermined cylinder bore size and more particularly to a piston ring test fixture for measuring tension of piston rings with repetitive accuracy. Further, this invention relates to a piston ring tension gage provided with a pressure measuring pneumatic cylinder and piston rod assembly having a strain load sensing cell and digital strain indicator readout means associated therewith. In addition, this invention is provided with vibratory means so as to measure the piston ring tension under substantially friction-free conditions.

The vibrating action substantially reduces friction between piston ring assembly being checked, the ring holding fixture and the components of the piston ring tension gage itself.

While this invention can be used to gage conventional snap-type oil rings, it is primarily useful in gaging the tension of oil ring assemblies of the type used in most internal combustion engines. These oil ring assemblies are comprised of a flex or vented type spacer which is retained in the piston ring groove by one or two thin rail members assembled therewith in the piston ring groove. The tension of the combination of rail or rails and the spacer (primarily the spacer) forces them against the cylinder wall, thus allowing for lubrication of the piston and cylinder wall yet wiping all excess oil back down from the cylinder wall.

As will be hereinafter described and discussed, it is of critical importance that the exact proper amount of tension be exerted by the piston ring assembly so that the rails bear against the cylinder wall with sufficient pressure to wipe excessive oil back to the lower part of the engine but not with an excessive amount of tension or pressure so that it would wear the cylinder walls.

An oil ring assembly which does not exert sufficient tension against the cylinder wall permits excess oil to remain thereon. The excess oil tends to gain entry to the top half of the internal combustion engine, past the compression ring or rings, so as to be burned by the combustion portion of the engine.

Due to the fact that the internal combustion engine is not designed for this type of fuel mixture, poor performance of the engine results and undesirable added emissions are formed which must be controlled by added equipment or allowed to escape to the atmosphere. It is such unwanted emissions which increase the damage to the ecology and which are sought to be controlled by ennvironmentalists through the enactment of legislation which requires the installation of added equipment, such as catalytic convertors, to eliminate or otherwise control the undesirable emissions. Such improper fuel mixtures with the resultant poor engine performance and the added emission control equipment results in added costs of operation. Further, the present high cost of oil results in increased operational costs as well as needless waste of oil at a time when there is critical shortage thereof.

It is thus seen that it is important to insure that properly fitting oil ring assemblies are initially installed thereby insuring that the exact proper tension is exerted against the cylinder wall from the outset.

This invention provides substantially automatic gage which simulates the in situ use environment of the oil ring assembly and exactly measures the tension thereof so as to determine the pressure it will exert against the cylinder wall. Further, in view of the fact that the spacer element is of a connected segment type, it must be gaged while contained in a holding fixture which simulates the actual piston ring groove in which it will be installed.

The use of the holding fixture type of gage has built-in element of friction which must be substantially removed in order to obtain an accurate calibration of the tension factor only. As will be hereinafter described, this gage substantially removes the friction factor by means of a unique air vibrator system incorporated thereinto.

In order to achieve proper operation in use and to avoid the problems discussed herein, piston rings of the same size and type, either solid or vented, should have substantially uniform characteristics. For example, a plain compression snap ring should open a pre-selected distance at its parting end and, upon closure, should form as near a circular outline as possible. It should require a predetermined force to close the ring at its parting end so that the ring will exert a uniform predetermined peripheral pressure against a cylinder wall.

It is necessary that all rings of a particular size and type should be substantially uniform and identical. A ring designed for a certain size of cylinder and with a diameter and cross sectional dimension to correspond will also have specified with respect to it, a tension which is a measure of force required to close the ring at its parting to the dimension it will be in use. Thus, rings must be tested for acceptance or rejection in conformance to such specifications within specified tolerance limits. Therefore, both the manufacturer of the rings and the user in the engine assembly plant must inspect the rings to deterine that they conform to the desired specification.

The present invention meets several needs which have existed and which have not been met by the devices of the prior known art. This invention provides repetitive and accurate measurement of the tension of piston ring assemblies tested thereby. By providing piston ring assemblies that properly fit in their operative use location, excessive engine wear is avoided, excessive oil use is eliminated, engine performance is increased, and undesirable air emissions are decreased.

The automatic operation of the piston ring tension gage greatly reduces the labor costs involved in the gaging operations. Heretofore, such gaging operations were substantially manual and required the judgement of individual operators which introduced human error in the test procedures.

An object of this invention is to provide a piston ring tension gage which is substantially automatic in its operation so as to eliminate human error which may be introduced due to differences in operating techniques by individuals utilizing the gages. In the gage of the instant invention, all human involvement is eliminated once the ring to be checked has been placed in the gage and the gaging cycle has begun. An accurate, repeatable, measurement of tension is obtained regardless of the person operating the gage. The accuracy and repeatability of the measurement is enhanced by the fact that each component of the gage assembly is a precision machined part or is an electric or electronic component which is automatically cycled to measure the pressure being exerted by the oil ring assembly.

Various factors during the gaging cycle effect the accuracy and repeatability in the measurement of the amount of tension of the piston ring assembly at its compressed or cylinder bore size dimension. The friction factor must be substantially removed before an accurate calibration of the tension can be determined. This is accomplished by use of an air vibrator which can be automatically regulated to a consistent cycle frequency at all times by controlling the amount of air pressure necessary to operate it.

The rate of travel of closing the ring assembly to its specified size is another factor which affects the accuracy and repeatability of the amount of tension being determined. This is accomplished by use of an electric motor which drives a precision machined screw at a predetermined controlled rate of travel which is standard on all of the gages.

Further, in order to check any ring in as friction-free state as possible, the ring is first closed at its parting to a dimension slightly smaller than the specified bore size and then be allowed to expand out to the actual bore size specification. At that point the actual tension amount is accurately determined. This is accomplished by use of a pneumatic cylinder to force a piston and rod to act against an anvil extension provided on the movable plate. The movable plate is thus moved to a point whereby the ring assembly is compressed to a size smaller than the desired cylinder bore size. The air is then exhausted from the pneumatic cylinder which allows the piston and rod to return to its original position, thus allowing the movable plate to back off so that the ring assembly expands to the desired specified bore size. It is extremely important for accuracy and repeatability that the amount of tension be measured at the exact dimension specified for cylinder bore size. The entire testing cycle is automatically sequenced at a controlled rate to provide repetitively accurate measurement of the tension of the piston ring assemblies being tested. An electric motor is automatically operated to provide a controlled closing of the movable plate so as to compress the piston ring assembly to a diameter smaller than the desired bore size. When the desire closure is achieved, the electric motor is automatically shut off and the pneumatic cylinder is automatically exhausted so as to allow the piston ring assembly to expand to the desired specified bore size. The vibrator unit is allowed to continue in operation for five seconds and is then automatically shut off and the tension reading is then taken at a positive bore size position.

Another factor of importance in achieving accuracy and repeatability in measuring the amount of ring tension are the means utilized in making such measurements. A strain gage or load cell is assembled in such a manner that the amount of tension of the ring assembly exerts a force against the load cell so that movement of the load cell in millionths of an inch is transferred to an electronic digital strain indicator. The strain indicator has the capability of transforming the load cell movement factor into a weight factor. The reading is shown on the face of the digital strain indicator in digital figures.

Another object of this invention is to provide an automatic versatile piston ring tension gage which has the capability of checking the tension of substantially all sizes of rings that are in use in internal combustion engines of all types. The tension gage can selectively be set to gage a ring of a pre-determmined size and checks for the specified tension on the rings being inspected. The tension gages have the capability to be calibrated accurately so that the same ring or ring assembly tested on any unit would give the same tension reading, thus resulting in accurate and repeatable test and gaging results.

An object of this invention is to provide a structure for accurately gaging the amount of tension of piston rings when compressed from a free state to the dimension of the cylinder bore in which they are to be used.

Yet another object of this invention is to provide a piston ring gaging device which determines the tension of a piston ring or piston ring assembly through full peripheral area contact therewith rather than a limited two or three point contact. The full peripheral contact with the piston ring assembly being tested is accomplished by means of twenty-four adjustable bearing elements evenly spaced around the circumference of the ring being tested. Thus, the actual amount of tension is gaged by, in effect, simulating the cylinder wall that the ring bears against when in actual use.

A still further object of this invention is to provide a piston ring gaging device which is relatively inexpensive to operate because the amount of direct labor to accomplish the gaging process is greatly reduced from present industry standard gaging methods.

Other objects and advantages found in the construction of the invention will be apparent from a consideration of the following specification in connection with the appended claims and the accompanying drawings.

IN THE DRAWINGS

SPECIFIC DESCRIPTION

Figure 1:
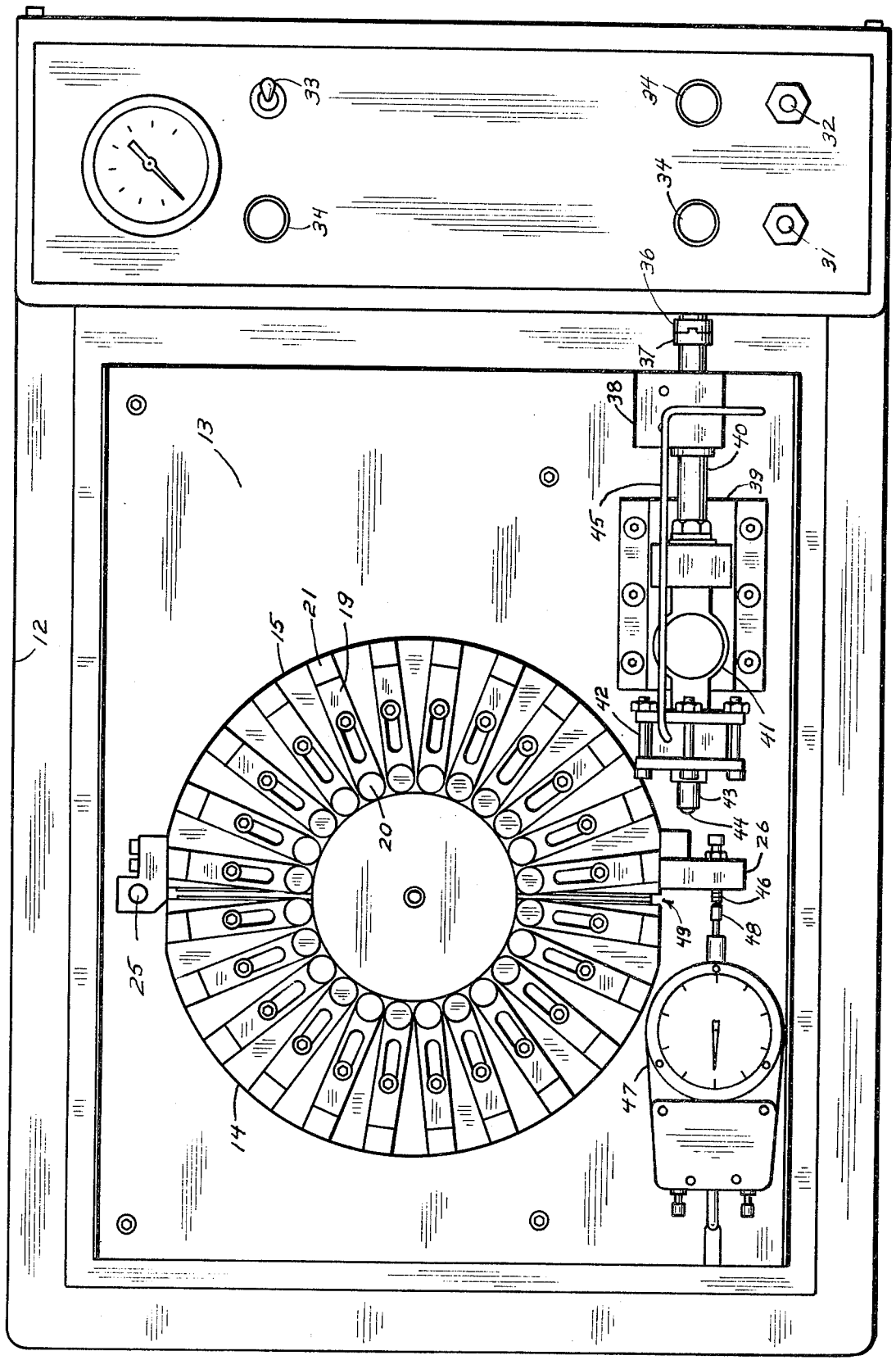
FIG. 1 is a top plan schematic view of the piston ring tension gage.

As shown in the drawings, the piston ring tension gage consists of a piston ring compression unit and a digital strain indicator read-out unit.

The piston ring tension gage 11 consists of a console housing 12 provided with a horizontal gage base support plate 13. The plate 13 is mounted on a rubber insulator and rubber spacer (not shown) provided on the console 12.

Figure 7:
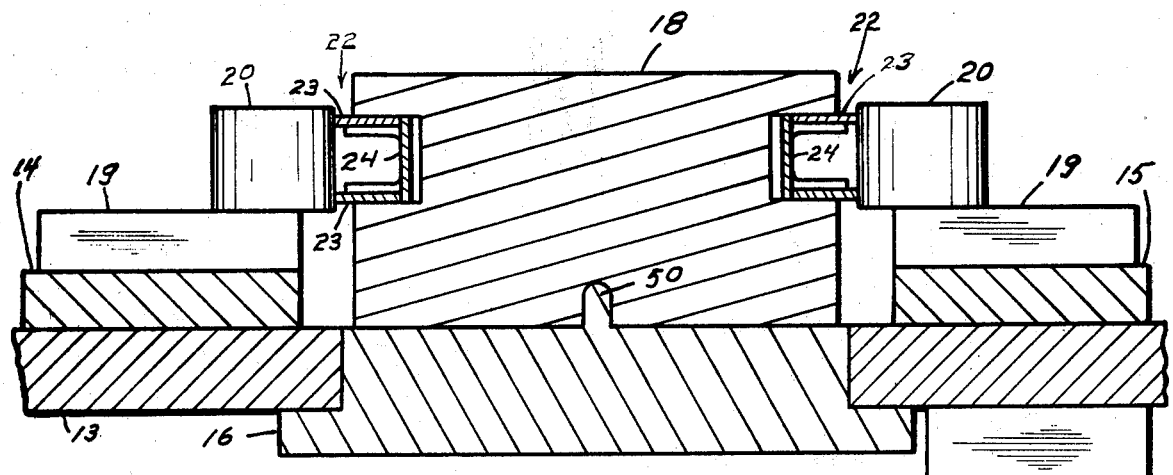
FIG. 7 is a side schematic view showing the piston ring holder in its operative use position.

A stationary gage plate 14 and an oppositely positioned movable gage plate 15 are mounted on the upper surface of the base support plate 13. The stationary gage plate 14 is semi-circular in configuration and cooperates with the semi-circular movable gage plate 15 to selectively engage a piston ring or piston ring assembly therebetween. As shown in FIG. 7, ring fixture base 16 is provided through the gage base plate 13 and extends upwardly so as to selectively support a ring master disc 17 or a ring holding fixture 18 which holds a piston ring or piston ring assembly 22 in position to be gaged.

A plurality of adjustable bearing slides 19 and bearing assemblies 20 are postioned in ways 21 provided on the upper surfaces of the stationary gage plate 14 and movable gage plate 15. The bearing slide assemblies 19 are selectively adjusted so that the bearing assemblies 20 engage the ring master disc 17 so as to be properly fixedly positioned to engage and subsequently gage the specified tension of a piston ring assembly positioned in the ring holding fixture 18. When properly adjusted and fixedly set in the desired size, the bearing assemblies 20 cooperate to engage the outer peripheral surface of the piston ring or piston ring assembly 22 being gaged.

Figures 4, 8:
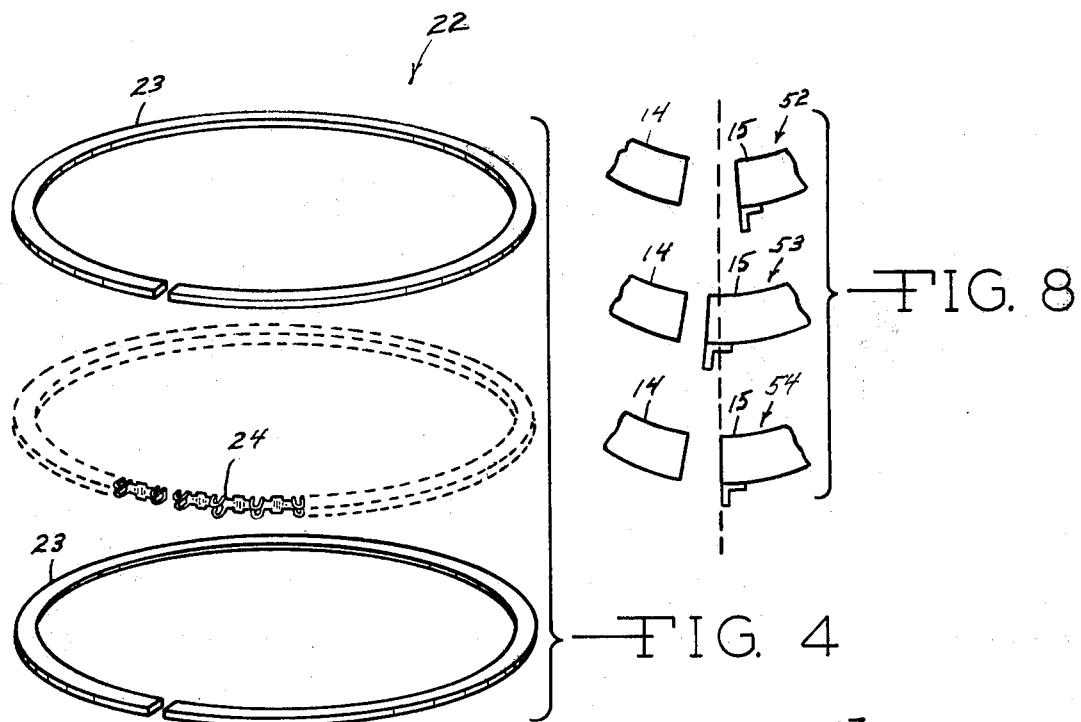
FIG. 4 is a perspective expanded view of the piston ring assembly which is tested.
FIG. 8 is a schematic view of the sequential movement of the movable gage plate.
Figure 6:
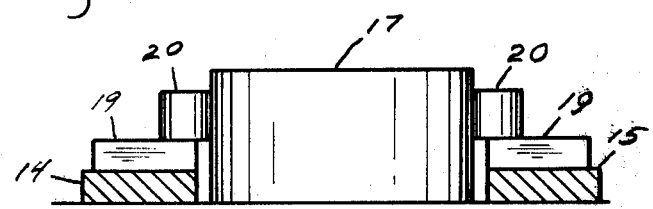
FIG. 6 is a schematic view showing the use of the master disc used in adjusting the gage for use.

As shown in FIG. 4, one form of the piston ring assembly 22 being tested consists of outer rail members 23 and a vented spacer member 24 loosely positioned therebetween. This type of oil ring assembly is well known and will not be described herein. In addition, it is contemplated that a compression ring (not shown) can be similarly tested.

Figure 2:
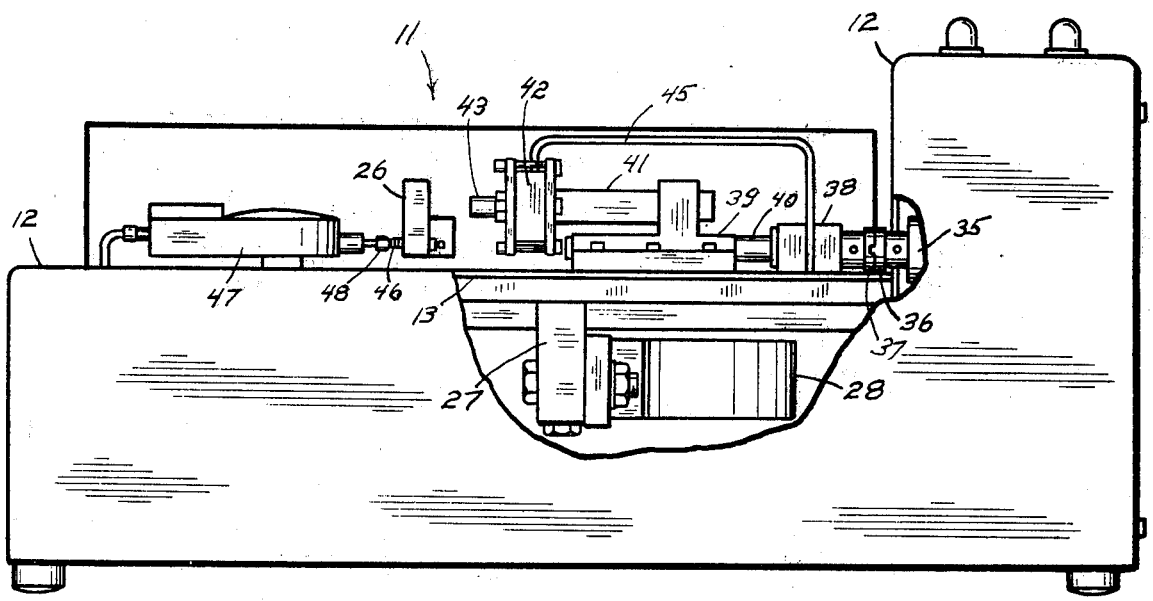
FIG. 2 is a front elevation schematic view thereof.
Figure 3:
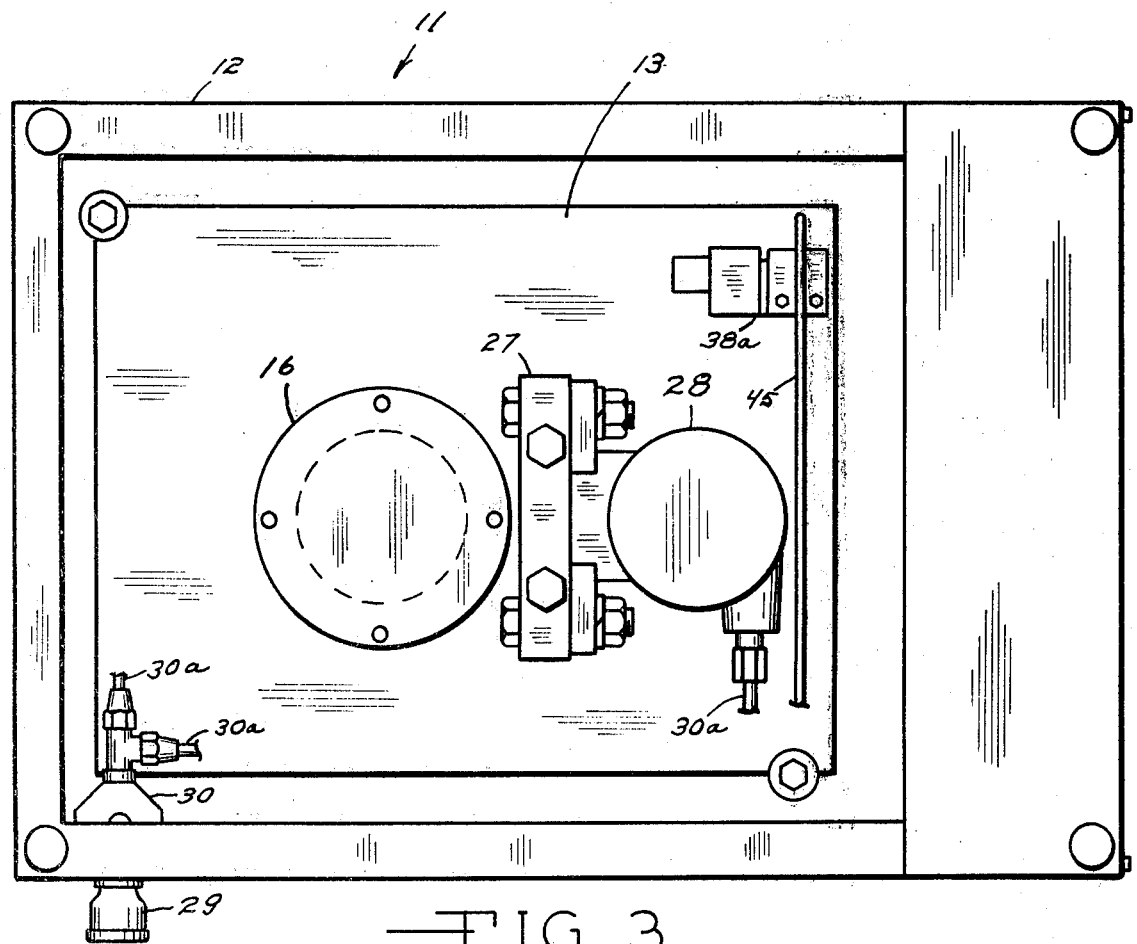
FIG. 3 is a bottom view thereof.

The movable gage plate 15 is movable about the pivot pin 25. An anvil extension 26 is mounted on the front of the movable plate 15 so as to extend outwardly therefrom as shown in FIGS. 1 and 2. For purposes of clarity, the stationary gage plate 14 and the movable gage plate 15 and associated members are not shown in FIG. 2.

A vibrator mounting block assembly 27 is provided on the lower surface of the base plate 13 and the air vibrator 28 is mounted thereon.

The air supply for the unit enters at the intake 29 and passes through an air filter 30. The air supply passes into a tube assembly 30a which is only shown in part. The tube assembly includes an air pressure regulator (not shown) which is adjusted to allow a predetermined pressure (p.s.i.) of air to flow to operate the air vibrator 28. An electric solenoid (not shown) actuates the air vibrator when the forward switch 31 is engaged.

The forward switch 31 is provided on the raised end of the console 12 which operates the motor and air solenoids (not shown). A reverse switch 32 is also provided on the raised end of the console which reverses the operation of the electric motor at completion of gaging of the tension of the piston ring. A power switch 33 is provided to turn electrical on or off to all components. Indicator lights 34 are provided adjacent their respective switches 31, 32 and 33.

An electric motor 35 is provided in the raised end of the console 12. The electric motor shaft drive coupling 36 engages the screw coupling 37 as shown in FIGS. 1 and 2.

A bearing block 38 is positioned on the base plate 13 and is used as a means of stopping the rearward motion of the drive screw 40. A microswitch assembly 38a is provided under the bearing block 38 and acts to shut off the electrical power to the motor 35 when the gage has completed its reverse cycle.

A slide block 39 is provided on the base plate and has drive screw 40 assembled therethrough which is provided with a coupling 37. The slide block 39 is positioned on the base plate 13 so that the drive screw coupling 37 is aligned with and engages the coupling 36 on the shaft of the electric motor 35.

A load strain measuring cell 41 is provided on the slide block 39. A pneumatic cylinder 42 is operatively connected to the forward end of the load cell 41. The pneumatic cylinder 42 is provided with a piston and rod assembly 43 which has a ball bearing 44 which selectively contacts the raised portion of the anvil member 26 when the pneumatic cylinder 42 is actuated.

The pneumatic cylinder 42 is operated by air pressure supplied through air supply line 45. Actuation of the pneumatic cylinder 42 causes the piston and rod assembly 43 to drive against the anvil 26. This, in turn, causes the movable gage plate 15 to close to a slight distance smaller than the required gaging bore size so as to achieve a simulated diameter size slightly smaller than the exact diameter of the piston ring whose tension is being measured.

The air supply to the pneumatic cylinder 42 is then shut off and the air is allowed to exhaust from the cylinder so as to allow the piston to seat back into the cylinder. The movable gage plate 15 is thus allowed to return rearward so that the peripheral diameter established by the bearing slide assemblies 19 and bearings 20 is at the exact diameter desired for calibrating the tension of the piston ring being tested.

An adjusting screw 46 is provided through the anvil 26 and is utilized for adjusting the forward shut off movement of the movable plate 15 during the gaging cycle.

An electricator switch 47 is provided on the base plate 13 and has a needle contact 48 which is aligned with the adjusting screw 46 provided on the anvil 26. In operation, the electric motor drives the slide block 39 which has the load cell 41 and pneumatic cylinder 42 provided thereon as previously described. In response to the movement of the pneumatic cylinder 42 acting upon the anvil 26, the movable gage plate 15 of the gage is forced to close until the adjusting screw 46 contacts the needle 48 extending from the electricator switch 47. The electricator switch 47 is adapted to selectively shut off the electric drive motor 35 which stops the closing action on the movable gage plate 15. The electricator switch 47 simultaneously shuts off the air supply to the pneumatic cylinder 42, thus allowing the movable plate 15 to return to the desired cylinder bore gaging diameter. In addition, the electricator switch 47, through the use of a timed relay, permits the air supply to the vibrator unit 28 to continue for a short period of time.

The foregoing sequential steps allows for the actual measurement or calibration of the tension of the piston ring to be measured under as friction free conditions as possible due to the fact that the ring or ring assembly has been initially compressed to a diameter smaller than the specified diameter and subseqently allowed to expand to the desired specified diameter. During this entire cycle, the piston ring or piston ring assembly is under continuous vibration so as to substantially remove or decrease the effects of friction thereon.

It should be noted that mechanical, air, electric and electronic components such as timer relays, solenoids, transformers, rectifiers and the like are utilized to accomplish the automatic and sequential cycling shown and described herein. Inasmuch as the operation of such components is well known in the art, they are not shown in the drawings. The electrical power is supplied to the unit through a connector (not shown). A guard assembly (not shown) and a bottom cover (not shown) are provided to protect the operator, protect the functional parts and to reduce the noise emitted by the vibrator.

The electricator switch 47 is also provided with a reading dial indicator which reads at zero when the gage is mastered for a specified bore size. The operator can thus visibly check and determine if the gage is properly mastered so that the piston ring tension is being recorded at exactly the desired specified bore size diameter at all times.

Each digital strain indicator and load cell must be calibrated as a unit in order to determine the proper gaging factor to be used on the digital strain indicator prior to the assembly of the load cell on the gage.

A master disc 17 of the exact diameter of the cylinder bore size of the piston ring whose tension is being checked must be used to master the gage for each size of piston ring or ring assembly being tested.

A ring holding fixture 18 is provided which simulates the groove of the piston in which the piston ring is to be eventually installed. Thus, the piston rings are tested under test conditions which carefully simulate actual test conditions.

OPERATION

A shim member 49 must be placed in the gap between the movable gage plate 15 and the stationary gage plate 14 each time the gage is mastered for a different diameter size of ring whose tension is to be measured or calibrated. With the shim member in place, the adjustable bearing slides 19 are adjusted so that bearing members 20 contact the master 17 being used to set the gage unit for the proper specified diameter of the cylinder bore or diameter of the piston ring being tested. The electricator switch 47 is adjusted so that with the shim member 49 removed, the forward cycle of the gage is not shut off until it continues beyond the actual desired specified bore diameter and subsequently returns to the actual bore diameter size being measured. This is accomplished by automatically and sequentially shutting off the air supply to the pneumatic cylinder, and allowing the air to exhaust, which in turn allows the piston and rod assembly driving the anvil 26 to seat in the cylinder 42.

In operation, the electrical power source is turned on for the digital strain indicator read-out and the unit allowed to warm up for approximately five minutes. The strain bridge toggle switch is set on "full".

A control knob on the digital indicator read-out unit must be adjusted to show a gage factor reading and subsequently adjusted to the correct gage factor unit that was determined when the load cell was calibrated to the digital strain indicator unit prior to the assembly of the load cell on the gage. After the proper gage factor reading has been adjusted to the desired specified reading, the control knob is returned to read in the "strain" position and a balance control is adjusted until the indicator reads "zero".

The ring compression unit is then mastered to the desired cylinder bore size by first loosening all of the adjustable slide assemblies located on both the stationary gage plate and the movable gage plate. The desired specified size master disc is then placed in the center of the ring fixture base over the locating dowel pin 50. A shim gage is inserted between the stationary plate and the movable plate and is held in this position by manually pushing and holding the movable plate 15 against it.

The slide assemblies 19 are then adjusted until each bearing assembly 20 contacts the peripheral edge of the master disc 17 with substantially equal pressure. The adjustable slides 19 are then securely tightened into their operative use positions.

The adjustable screw 46 located in the anvil 26 is then adjusted so that its contact point acts against the point of the needle member 48 extending from the electricator switch 47 to cause the dial indicator on the face of the electricator switch 47 to read zero. The master disc 17 and the shim member 49 are then removed. The ring fixture disc 18 containing the piston ring or piston ring assembly 22 to be tested is then mounted on the gage between the stationary and movable gage plates as indicated in FIG. 7.

The electrical power source is then turned on and the air supply is opened to the gage. The operator checks the air pressure gage to insure that the desired air pressure is supplied to actuate the vibrator unit. This can be varied by adjusting a regulator valve (not shown) provided in the console. The "forward" button is depressed to start the forward cycle of the gage. After the forward button has been depressed, the gage will complete the forward cycle automatically. The forward cycle continues until the indicator on the electricator switch registers approximately a plus 0.010 inch. It then returns to zero when the air exhausts from the pneumatic cylinder as previously described.

When the gage completes the forward cycle, the operator checks the dial on the electricator switch 47 to determine that it reads zero. If it does not read zero, it can be corrected by adjusting the fine adjustment screw 51 provided in the end of the electricator switch 47.

The vibrator unit 28 will continue to run approximately five seconds after the movable gage plate 15 has stopped. The reading of the digital strain indicator should not be taken until the vibrator unit has stopped. The reading of digital strain indicator will show in tenths of pounds tension with the numerals at the right hand of the dial face being in tenths of a pound.

After the reading of the amount of tension of the piston ring is recorded, the "reverse button" is actuated and the gage will cycle back and be automatically turned off.

The piston ring or piston ring assembly 22 is then removed from the ring holding fixture 18. The foregoing procedure can be continuously repeated to check any desired number of rings with complete repetitive accuracy not affected by human error.

Figure 5:
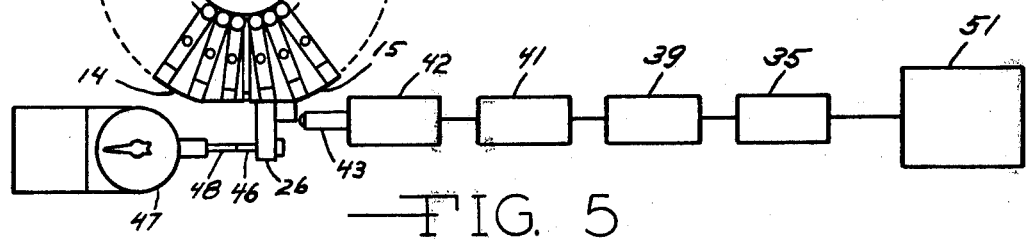
FIG. 5 is a diagram schematic view of the components of the piston ring tension gage.

In summary and as shown schematically in FIG. 5, a piston ring tension gage is provided for the automatic testing of the tension of piston ring assemblies with repetitive accuracy. A motor 35 drives a slide block assembly 39 upon which a load cell 41 and pneumatic cylinder 42 are positioned. The piston and rod assembly 43 acts against the anvil 26 which selectively and controllably causes the movable plate 15 to close towards the stationary gage plate 14 as described herein. The adjusting screw 46 contacts the needle contact 48 to actuate the electricator switch 47 when the desired forward limit of travel has been reached. As previously described, the electricator switch 47 sequentially shuts off the electric motor, the air supply to the pneumatic cylinder and to the vibrator unit. The tension reading is then taken. The block 51 represents associated electronic components and digital strain indicator read-out equipment that are well known in the art.

As shown in FIG. 8, the automatic and controlled cycling described herein results in the sequential movement of the movable gage plate from the larger bore size position 52 to smaller than bore size position 53 and back to the desired specified bore size position 54 at which the tension measurement or reading is made.

It is thus seen that a substantially automatic piston ring tension gage is provided to measure the tension of a piston ring or piston ring assembly with repetitive accuracy in a substantially friction-free environment which simulates actual in situ use conditions and which virtually eliminates human error generally inherent in making such tests.

Various other modifications of the invention may be made without departing from the principle thereof. Each of the modifications is to be considered as included in the hereinafter appended claims, unless these claims by their language expressly provide otherwise.

We claim:

1. In an apparatus for gaging the tension of piston rings, the combination including:
    a console support frame provided with platform base plate thereon;
    a first semi-circular piston ring assembly engaging plate fixedly mounted on said platform base plate;
    a second semi-circular piston ring assembly engaging plate pivotally mounted on said platform base opposite said first fixedly mounted piston ring assembly engaging plate, said pivotally mounted second piston ring assembly engaging plate adapted to co-act with said first fixedly mounted piston ring assembly engaging plate so as to retain a piston ring assembly therebetween;
    a cylindrical piston ring holder mounted on said platform base intermediate said first piston ring assembly engaging plate and second piston ring assembly engaging plate, said piston ring holder adapted to loosely support a piston ring assembly between said first piston ring assembly engaging plate and said pivotally mounted second piston ring assembly engaging plate;
    pneumatic cylinder means provided on said platform base plate, said pneumatic cylinder means adapted to selectively act against said pivotally mounted second piston ring assembly engaging plate so as to close said second piston ring assembly engaging plate toward said first fixed piston ring assembly engaging plate to compress said piston ring assembly postioned therebetween;
    strain load sensing means provided in association with said pneumatic means, said strain load sensing means adapted to measure the tenson exerted by the piston ring assembly compressed to the specified bore size between said first piston ring engaging plate and said second movable piston ring engaging plate.

2. In the apparatus of claim 1 wherein vibratory means are provided in association with said platform base plate, said vibratory means adapted to provide continuous controlled vibratory motion to said piston ring assembly so as to achieve friction-free tenson measurement of the piston ring assembly mounted in said gage apparatus.

3. In the apparatus of claim 1 wherein an electronic digital strain indicator is provided in association with said strain load sensing means.

4. In the apparatus of claim 1 wherein a plurality of adjustable bearing means are provided on said fixed first plate and said pivotally mounted movable second plate, said bearing means adapted to selectively engage the outer circumferential surface of a piston ring assembly mounted in said apparatus.

5. In an apparatus for automatically gaging the tension of a piston ring assembly with repetitive accuracy, the combination including:
    a console support frame provided with platform base plate thereon;
    a first semi-circular piston ring assembly engaging plate fixedly mounted on said platform base plate;
    a second semi-circular piston ring assembly engaging plate pivotally mounted on said platform base opposite said first fixedly mounted piston ring assembly engaging plate, said pivotally mounted second piston ring assembly engaging plate adapted to co-act with said first fixedly mounted piston ring assembly engaging plate so as to retain a piston ring assembly therebetween;
    a cylindrical piston ring holder mounted on said platform base intermediate said first piston ring assembly engaging plate and second piston ring assembly engaging plate, said piston ring holder adapted to loosely support a piston ring assembly between said first piston ring assembly engaging plate and said pivotally mounted second piston ring assembly engaging plate;
    slide block means slidably provided on said platform base, said slide block means having screw drive means in association therewith;
    motor drive means in association with said screw drive means, said motor drive means adapted to drive said slide block means at a controlled rate of travel toward said movable plate;
    pneumatic cylinder means provided on said slide block means, said pneumatic cylinder means adapted to act against said pivotally mounted movable plate so as to close said movable plate toward said first fixed plate to compress said piston ring assembly positioned therebetween to a bore size diameter smaller than the specified bore size;
    control means provided on said base plate, said control means adapted to automatically limit the forward of travel of said slide block means, said control means adapted to deactivate said pneumatic cylinder to permit expansion of said piston ring assembly to the specified bore size; and
    strain load sensing means provided in association with said pneumatic means, said strain load sensing means adapted to measure the tension exerted by the piston ring assembly compressed to the specified bore size between the first fixed piston ring engaging plate and the second movable piston ring engaging plate.

6. In the apparatus of claim 5 wherein vibratory means are provided in association with said platform base plate, said vibratory means adapted to provide continuous controlled vibratory motion to said piston ring assembly being tested, said vibratory means adapted to automatically stop after said piston ring assembly is expanded to its specified bore size.

7. In the apparatus of claim 5 wherein an electronic digital strain indicator is provided in association with said strain load sensing means.

8. In the apparatus of claim 5 wherein a plurality of adjustable bearing means are provided on said fixed first plate and said pivotally mounted movable second plate, said bearing means adapted to selectively engage the outer circumferential surface of a piston ring assembly mounted in said apparatus.

9. In a method for automatically gaging the tension of a piston ring assembly, the steps which include:
subjecting the piston ring assembly being tested to a continuous controlled vibratory motion;
compressing the piston ring assembly at a controlled rate to a bore size smaller than the specified bore size;
expanding the piston ring assembly to the specified bore size;
terminating the vibratory motion being imposed upon the piston ring assembly; and
automatically measuring the tension of the piston ring assembly at the specified bore size when said vibratory motion has ceased.

* * * * *